Figure 1:
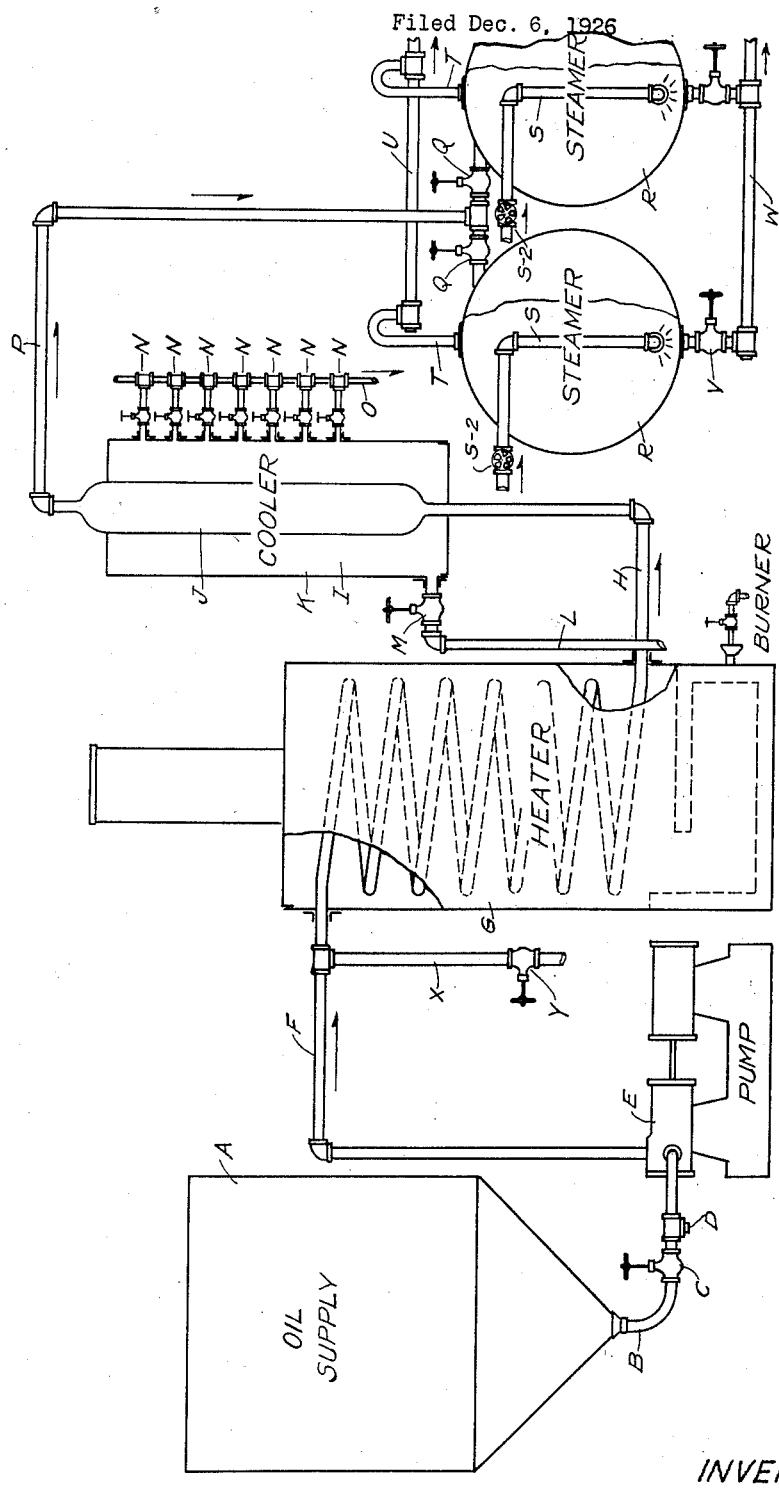

May 1, 1928.
P. W. PRUTZMAN
METHOD OF DECOLORIZING OILS AT HIGH TEMPERATURES
Filed Dec. 6, 1926

1,667,984

INVENTOR
Paul W. Prutzman.

Patented May 1, 1928.

1,667,984

UNITED STATES PATENT OFFICE.

PAUL W. PRUTZMAN, OF LOS ANGELES, CALIFORNIA, ASSIGNOR, BY MESNE ASSIGNMENTS, TO CONTACT FILTRATION COMPANY, OF SAN FRANCISCO, CALIFORNIA, A CORPORATION OF DELAWARE.

METHOD OF DECOLORIZING OILS AT HIGH TEMPERATURES.

Application filed December 6, 1926. Serial No. 152,924.

In decolorizing, deacidifying and purifying mineral lubricating oils, it has been customary to treat them with various powdered adsorbent materials, the treatment consisting in an intermixture of the adsorbent with the oil and the heating of the mixture for the purpose of rendering the adsorbent more active and efficient. It has been customary to conduct this heating under atmospheric pressure, and at the end of or shortly after the heating step to filter from the oil the solid adsorbent, together with the coloring matter and other impurities which such adsorbent has withdrawn from the oil.

The adsorbent materials used for this purpose are quite various in their nature and include fuller's earth and various types of clay, some varieties of light and porous magnesium silicate, animal and vegetable chars, diatomaceous earth, with and without a coating of carbon, certain clays or clay-like materials which have been treated with acid, and in general such materials as may be reduced to a fine powder for intermixture with the oil and which when so intermixed show the property of withdrawing coloring matter or other undesirable impurities from the oil.

Up to the present time it has been customary to effect the heating of the oil adsorbent mixture by two quite distinct methods. In one of these operations a body of oil and adsorbent, retained in a tank or mixing vessel having usually an open top, or in a still or similar substantially closed vessel having an outlet through a condenser, is heated to the desired temperature. From these vessels, either open or closed, the steam generated from the water contained in the adsorbent, and any oil vapors which might be produced by heating the oil, and the steam which in many cases is blown through the oil body to carry off cracked products, are allowed to escape to the open air or to the condenser. In the other method a flow-stream of intermixed oil and adsorbent is passed continuously through a heating means by which it is raised to the desired temperature, passing thence into a receptacle in which the vapors are separated from the oil, and are either allowed to escape to the air or are passed through the condenser by which they are liquefied. In the first case they are lost, while in the second case they are collected as a distillate which is usually of less value than the original oil, and which in any case is not the object of the operation.

The object to be attained in applying decolorizing and purifying adsorbents to oil is to improve the quality of the oil remaining at the end of the operation, and it is highly essential that the physical properties of the oil be as little as possible altered by the treatment. Further, as the adsorbent, the oil and the application are all costly, it is highly desirable that the yield of finished oil be as large as possible, in other words, that the least possible proportion of the original oil be either driven off as vapor, or entrained by the adsorbent when the latter is separated from the treated oil in form of a filter cake.

The efficiency of the adsorbents used for this purpose is much increased by raising the temperature at which they are applied. This increase in value progresses with rising temperature up to or even beyond the boiling point of the oil, and the progressive increase is so rapid that at very high temperatures, approaching those at which the oil breaks down into cracked napthas and carbon, it is several times the value of the same adsorbent at a temperature of say 250° F. It is obvious, therefore, that economy of expensive adsorbent and a corresponding saving in loss of oil through entrainment may be effected by increasing the temperature to which the oil and adsorbent mixture is heated.

On the other hand, under present methods of operation, in which the vapors of oil are allowed to escape to the air or are condensed with the production of a distillate, the temperature which may be carried is limited to that at which the oil commences to give off a material quantity of vapor at atmospheric pressure, for the obvious reason that if a higher temperature be carried the loss of oil by vaporization will soon overbalance the saving in oil entrainment resulting from the use of a smaller dose of adsorbent. This temperature, which of course varies widely with different oils, is referred to in this specification and in the attached claim as the "vaporization point", and as this term is recognized to be somewhat vague it is here defined for the purpose of the present specification and claim to mean the closed-cup flash point of an oil to be treated, as determined by the Pensky-Martin tester described and by the procedure directed in Bureau of Mines Technical Paper 323–A entitled "Petroleum Products, and Methods for Testing", pages 52 to 57 inclusive. Where the term "vaporization point" is used in reference to an oil which has already been treated, it will be understood that the term refers back to the characteristics of the oil prior to the treatment with adsorbent, it being recognized that such treatment with adsorbent at elevated temperatures produces volatile decomposition products which were not present in the original oil.

My invention lies in the provision of a method or process by which oils may be treated with adsorbents at temperatures above the vaporization point, and even above the boiling point, without the loss of vapor which is incurred in present methods of operation. This end is accomplished by first heating the oil to any desired temperature in a receptacle into which the vapors may be evolved but from which they can not escape, and thereafter cooling the vapors in contact with the non-vaporized oil to such temperature that the vapors will be condensed and the liquid condensate intermixed with the non-vaporized oil. The product of this operation is an oil which has been treated at a much higher temperature than it would be possible to carry under the methods now in use, but which nevertheless contains all its original constitutents and which has suffered no loss in volume by vaporization.

The last statement, if not qualified, might be misleading. In heating adsorbents with oils, and particularly with the mineral oils to which this process is most particularly adapted, a certain amount of cracking or heat decomposition is produced by the adsorbent itself, at temperatures much below those at which such oils would decompose if heated in the absence of adsorbent. These bodies appear to exercise a catalytic action by which certain constituents of the oil are broken down with the formation of tarry bodies, which are taken up and ultimately removed by the adsorbent, and of relatively volatile decomposition products which are split off during the formation of these tarry bodies. Such volatile products should not be allowed to remain in the oil, as they are unstable to light and to air and are of a strong and objectionable odor. The adsorbent appears to cease to act as a catalyst when its adsorptive value is expended in withdrawing impurities from the oil, and therefore the proportion of oil which is converted into volatile decomposition products will vary, not with the temperature, but with the quantity of adsorbent used, and again by consequence, the smaller the adsorbent dose the smaller will be the proportion of cracked product.

In order to remove these decomposition products from the oil it is necessary to volatilize them, which is preferably accomplished by subjecting the oil to a steaming operation at a temperature below the incipient boiling point of the oil as originally taken, but close to or above the boiling point of the decomposition product. While it is not an essential part of my invention, it is highly desirable to cool the mixture of oil and adsorbent only to such temperature as will cause the liquefication of the orginal oil constitutents, thus allowing the more volatile decomposition products to pass out of the treating stage in the vapor phase. By operating in this manner a reheating of the oil for the purpose of driving off these volatile products is avoided.

The heating and subsequent cooling of a body of oil intermixed with adsorbent may be either intermittent or continuous. In intermittent operation, a body of intermixed oil and adsorbent is heated to the desired temperature in a closed vessel of sufficient capacity to provide reservoir space for the vapors evolved from the oil during the heating. As this space will necessarily be occupied by air or by some medium used to displace air during the initial stages of the heating, the vessel must be provided with a means for venting the air or steam with which this space is filled. If the oil be first heated to a temperature of say 250° F. the air overlying the oil may be displaced by steam, and as, on further heating, the heavy vapors of oil rise from the surface of the oil mass this steam may be allowed to escape through relatively small orifices in the upper portion of the vessel, and this, because of the high specific weight of the oil vapors, without any appreciable loss of oil by vaporization. After cooling below the vaporization point, steam may be admitted below the surface, and preferably at the bottom of the oil body, and the cracked volatile products steamed off and condensed in the usual manner.

This is not the most desirable method of applying my invention for the reasons, first, that the apparatus required is large and cumbersome in proportion to its treating capacity and, second, that it is mechanically difficult to maintain the vapor space over the oil body at the same temperature as that of the oil body itself. If the vapor space or the walls surrounding such space are at a materially lower temperature than that of the oil body, there will be a continuous condensation and re-evaporation of the lighter portions of the oil during the heating period, and this alternation between the liquid and the vapor phase is productive of heat decomposition which seriously affects the quality of the oil.

It is highly preferable to carry out the principle of my invention in a continuously operated apparatus, the practical application of which may be best appreciated from the following description of an illustrative embodiment thereof, taken in connection with the appended claim and the accompanying drawing in which—

Fig. 1 is a diagrammatic elevational view showing one advantageous general arrangement of apparatus suitable for use in the practice of my invention, parts being broken away. This figure is provided with legends and other particulars adapting it to serve incidentally as a flow-sheet.

A is a tank adapted to hold the supply of the oil to be treated. In this tank the oil may be intermixed with the adsorbent by suitable mechanical means, the intermixture being maintained during the conduct of the operation. A small propeller type agitator situated close to the bottom of the tank is a desirable means for producing and maintaining admixture of the oil with the adsorbent, which latter may be dumped into the tank from sacks or drawn into it from a more elevated bin or tank. The intermixed oil and adsorbent passes through the line B, controlled by the valve C for shutting off the oil supply in case of damage to the feed pump E.

It is often more desirable to feed the adsorbent into the system continuously and to maintain a supply of oil only in tank A. In such case a stream of an aqueous adsorbent mud, or a stream of such mud emulsified with a part of the oil to be treated, or a stream of such oil previously intermixed with adsorbent to a fluid condition, may be introduced in measured quantities into the opening D by means of a pump or other suitable injecting means.

The supply or mixed oil and adsorbent enters the suction of the pump E, which may be of any type desired so long as it is capable of forcing the oil through the system against frictional resistance. The oil leaves the discharge side of the pump, passing through the line F into the heater G.

This heater may consist of a brick-work setting comprising a combustion chamber provided with an oil burner or other means of producing hot fire gases, and a chamber in which is placed a coil of pipe for the heating of the oil flowing therethrough, or it may be of the well known means for continuously heating a flow stream of oil. In the heater G the oil is raised to the desired temperature and flows from such heater through the pipe H into the cooler I.

This cooler as here shown consists of an enlargement J of the pipe H surrounded by a water jacket K which is supplied with water through the line L from a source of supply not shown. The quantity of water passing through the cooler is regulated by manipulating the valve M, situated in the line L. The water jacket K is provided with a number of outlet pipes N, each of which is controlled by a valve. The level of water in the cooler jacket may be regulated by opening any one of these valves and closing the remainder, the height of the opening determining the height of the water level in the jacket. The water flowing through any of the pipes N passes through the waste pipe O, by which it is carried to any convenient point of disposal.

In the cooler I the temperature is reduced sufficiently to condense whatever vapor is generated in the heater G, excepting only the vapor of water and the vapor of such volatile cracked products as it may be desirable to leave in the vapor phase. From this cooler the oil passes through the pipe P into either of the branch pipes Q, each of which is controlled by a valve. By opening one of these valves and closing the other, either of the steamers R may be filled while the other steamer is being emptied.

Steam is admitted to the steamers through the lines S from a boiler or other source of supply not shown, each of the steam lines being controlled by a valve S–2 for regulating and shutting off the supply of steam as required. The pipes S each terminate in a longitudinal perforated pipe extending the length of the steamer, or in other suitable means for distributing a supply of steam below the surface of the body of oil contained in the steamer.

One of the steamers being filled, the stream from the line P is diverted into the opposite steamer. The steamers should be filled to about two thirds of their height with the hot oil. The valve Q leading into the full steamer having been closed, steam is admitted through the line S, escapes into the body of oil, withdraws therefrom such vapors of volatile cracked products as may be present, and carries such vapors into the riser pipe T, by which they are conducted into the vapor line U, which in turn conducts them either to the open air or preferably to a condenser of any of the well known designs, by which condenser they are cooled and liquefied, the liquid condensate being run to waste or saved for whatever fuel value it may contain. Steaming having been continued until the vapor or the condensate, as the case may be, has a sweet and inoffensive odor (showing that the volatile decomposition products have been completely withdrawn from the oil) the valve V in the bottom of this steamer is opened and the contents of the steamer is pumped out through the line W, to a filter press or other means of separating solids from liquids. The first steamer having been thus emptied and the second steamer having in the meantime been filled to the desired height, the stream of hot oil is diverted back to the first steamer, and the contents of the second steamer sweetened and pumped out in the manner just described.

It is impossible to state in figures the temperature to which the oil should be heated in the heater G, or the temperature to which it should be cooled in the cooler I. These temperatures vary with the nature of the oil, or more exactly, with the temperature at which the original oil commences to vaporize. It will therefore be sufficient to state that in the heater G the oil should be raised to a temperature above its vaporization point, and to a temperature as much above this point as may be reached without seriously decomposing the oil with the production of cracked napthas and carbon. In the cooler I it should be cooled to a point somewhat below the original vaporization point of the oil, but it is preferable not to cool very far below this point as otherwise a portion of the volatile decomposition products may also be condensed. It is desirable that these decomposition products should pass out of the cooler I in the state of vapor along with the condensed oil and the steam which accompanies the vapor of decomposition products, the steamers thus functioning as separators in which the mixture of treated oil and adsorbent settles to the bottom while the vapors of water and of cracked products escape through the line U.

If an aqueous adsorbent mud be injected into the suction side of the pump E, or if the adsorbent intermixed with oil in the tank A contain a material proportion of water, it will not be necessary to pass any steam through the coils in the heater G. If, however, a dry adsorbent is being used, it is preferable to admit a small supply of steam into the line F through the line X from a boiler or other source of supply not shown, such supply being controlled by the valve Y.

Any kind or class of oil which may be decolorized by the action of a powdered solid adsorbent at elevated temperatures may advantageously be used in carrying out my invention. The oil may be in its raw or crude condition, or it may have been acid treated and the acid reaction products washed therefrom, or it may have been acid treated and left in the acid condition. In the latter case the adsorbent will, in almost all cases, effect a complete neutralization or deacidification of the oil, this effect accompanying and being coincident with the decolorization and other purification of the oil by the adsorbent.

While I have described a suitable and practical means for the carrying out of my method invention I do not wish to be limited to the means shown nor to the steps therein set forth, inasmuch as the means for and manner of intermixing oil and adsorbent, heating and cooling the mixture, and separating the vapors of cracked products therefrom in the steamers, are not a part of my invention. Nor is it essential to the successful conduct of my invention to cool the oil only to the point where the original constituents of the oil recondense and the vapors of cracked products remain as vapor. What I have invented, and desire to claim as broadly as the state of the art will permit, is the heating of the mixture of oil and adsorbent to a temperature above the vaporization point of the oil, retaining the vapors in contact with the oil, and cooling the oil and the vapors together to such temperature as will cause the vapors to liquefy and to intermix with the non-vaporized portions of the oil.

I claim as my invention:

The method of decolorizing and purifying lubricating oils with adsorbents which comprises; heating in a flow stream a mixture consisting solely of the oil to be decolorized and an adsorbent to a temperature above the vaporization point of the oil and retaining the vapors within said flow stream by subsequently cooling said flow stream to a temperature below the vaporization point of the oil.

In witness that I claim the foregoing I have hereunto subscribed my name this eighteenth day of November, 1926.

PAUL W. PRUTZMAN.